(12) United States Patent
Mori et al.

(10) Patent No.: US 9,463,425 B2
(45) Date of Patent: Oct. 11, 2016

(54) SYSTEM FOR IMPROVING HYDROPHILICITY OF CONTACT LENS AND APPLICATION OF THE SAME TO PACKAGING OF CONTACT LENS

(71) Applicant: MENICON CO., LTD., Nagoya-Shi (JP)

(72) Inventors: Osamu Mori, Kasugai (JP); Nao Yoshida, Kasugai (JP)

(73) Assignee: MENICON CO., LTD., Nagoya-shi (JP)

( * ) Notice: Subject to any disclaimer, the term of this patent is extended or adjusted under 35 U.S.C. 154(b) by 304 days.

(21) Appl. No.: 14/136,412

(22) Filed: Dec. 20, 2013

(65) Prior Publication Data

US 2014/0102917 A1  Apr. 17, 2014

Related U.S. Application Data

(63) Continuation of application No. PCT/JP2011/070051, filed on Sep. 2, 2011.

(51) Int. Cl.
*C11D 3/22* (2006.01)
*C08L 5/08* (2006.01)
(Continued)

(52) U.S. Cl.
CPC ............ *B01F 17/005* (2013.01); *A45C 11/005* (2013.01); *C08L 5/08* (2013.01); *C11D 3/0078* (2013.01); *C11D 3/2096* (2013.01); *C11D 3/227* (2013.01); *C08K 2003/324* (2013.01)

(58) Field of Classification Search
CPC .................................................. C11D 3/0078
See application file for complete search history.

(56) References Cited

U.S. PATENT DOCUMENTS 4,925,017 A * 5/1990 Jessen .................. A45C 11/005
206/5.1
5,523,316 A * 6/1996 Gan ..................... A61K 9/0048
514/15.1

(Continued)

FOREIGN PATENT DOCUMENTS

JP   WO 9104279 A1 *  4/1991  ......... C08B 37/0072
JP   2000-109892 A1    4/2000

(Continued)

OTHER PUBLICATIONS

LB Szczotka-Flynn. "Chemical Properties of Contact Lens Rewetters." http://www.clspectrum.com/articleviewer.aspx?articleID=13005, accessed Jun. 4, 2015, published Apr. 1, 2006, 5 printed pages.*

(Continued)

*Primary Examiner* — Isaac Shomer
(74) *Attorney, Agent, or Firm* — Oliff PLC

(57) ABSTRACT

Providing a system which can exhibit a desired effect of improving hydrophilicity of a contact lens without causing adverse influences on sense of use of the contact lens and a cleaning effect, and which can effectively prevent adhesion of lipid stain. Also providing a packaging solution for the contact lens which can effectively suppress or prevent reduction of its viscosity with time even when the packaging solution is sterilized by heating. The contact lens is immersed in an aqueous solution which contains a low-molecular weight hyaluronic acid having a molecular weight of not higher than 80,000, or a salt or derivative thereof, and which has a pH of 6.0-8.0 and an osmotic pressure of 220-380 mOsm.

23 Claims, 1 Drawing Sheet

(51) Int. Cl.
    *B01F 17/00*    (2006.01)
    *A45C 11/00*    (2006.01)
    *C11D 3/00*    (2006.01)
    *C11D 3/20*    (2006.01)
    *C08K 3/32*    (2006.01)

(56) References Cited

U.S. PATENT DOCUMENTS

| | | | |
|---|---|---|---|
| 2003/0013643 A1* | 1/2003 | Wessels | A61K 31/00 424/150.1 |
| 2004/0186028 A1 | 9/2004 | Hu et al. | |
| 2007/0265353 A1* | 11/2007 | Matsuhisa | A61K 9/0048 514/762 |
| 2007/0293648 A1* | 12/2007 | Sheardown | C08B 37/0072 528/26 |
| 2010/0234318 A1 | 9/2010 | Matsumoto et al. | |
| 2012/0076687 A1 | 3/2012 | Mori et al. | |

FOREIGN PATENT DOCUMENTS

| | | |
|---|---|---|
| JP | 2003-534562 A1 | 11/2003 |
| JP | 2004-077953 A1 | 3/2004 |
| JP | 2004-523777 A1 | 8/2004 |
| JP | 2006-520793 A1 | 9/2006 |
| JP | 2007-044536 A1 | 2/2007 |
| JP | 2007-264622 A1 | 10/2007 |
| JP | 2008-519846 A1 | 6/2008 |
| JP | 2011-037737 A1 | 2/2011 |
| WO | 01/30866 A1 | 5/2001 |
| WO | 02/045759 A2 | 6/2002 |
| WO | 2006/053164 A2 | 5/2006 |
| WO | 2007/086936 A1 | 8/2007 |
| WO | 2008/001872 A1 | 1/2008 |
| WO | 2008/076506 A1 | 6/2008 |
| WO | WO 2008076506 A1 * | 6/2008 ............ A61L 12/04 |
| WO | 2011/001461 A1 | 1/2011 |

OTHER PUBLICATIONS

A Weeks, D Luensmann, A Boone, L Jones, H Sheardown. "Hyaluronic acid as an internal wetting agent in model DMAA/TRIS contact lenses." Journal of Biomaterials Applications, vol. 27(4), 2011, pp. 423-432.*

Abstract for "Hyaluronic acid as an internal wetting agent in model DMAA/TRIS contact lenses." http://www.ncbi.nlm.nih.gov/pubmed/21750182, accessed by examiner on May 11, 2016, published online on Jul. 12, 2011, 1 printed page.*

Extended European Search Report (Application No. 11871661.2) dated Feb. 27, 2015.

International Search Report (Application No. PCT/JP20111/070051) dated Oct. 11, 2011.

* cited by examiner

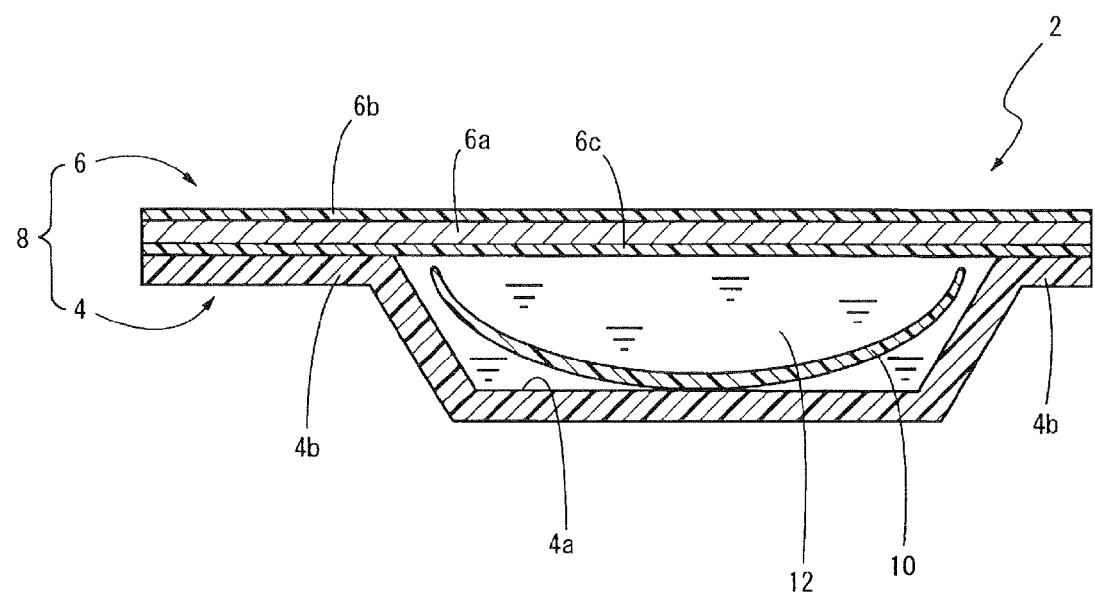

SYSTEM FOR IMPROVING HYDROPHILICITY OF CONTACT LENS AND APPLICATION OF THE SAME TO PACKAGING OF CONTACT LENS

This application is a continuation of the International Application No. PCT/JP2011/070051, filed Sep. 2, 2011, the entireties of which are incorporated herein by reference.

BACKGROUND OF THE INVENTION

1. Field of the Invention

The present invention relates to a system for improving hydrophilicity of a contact lens and application of the system to packaging of the contact lens, and more particularly to a technique for advantageously improving the hydrophilicity of the contact lens while advantageously packaging the contact lens for marketing the contact lens.

2. Description of Related Art

One of conventional dissatisfactions most commonly felt by contact lens users (consumers) is dryness of the eye while wearing the contact lens. Thus, in order to improve the contact lens itself, it has been considered to use a contact lens material having a high degree of water retaining property, or to employ a treatment process for improving the hydrophilicity of the surface of the contact lens. It has also been considered to add a component having a high degree of moisture retaining property to a contact lens preserving solution or other solution to be used in contact with the contact lens, in order to improve the hydrophilicity of the surface of the contact lens for thereby mitigating the dryness of the eye.

In the field of cosmetics, various compounds have been proposed as the component having a high degree of moisture retaining property. Among such compounds, a hyaluronic acid is a well known compound having an extraordinary high degree of water retaining property per one molecule. Particularly, a high-molecular weight hyaluronic acid is preferably used since it has a structure in which, one molecule has multiple water retaining portions, and which can exhibit an excellent water retaining property. Conventionally, a natural hyaluronic acid derived from the combs of chickens is used, and this natural hyaluronic acid is the high-molecular weight hyaluronic acid having a molecular weight of not lower than one million. Accordingly, the hyaluronic acid is generally recognized as the high-molecular weight hyaluronic acid.

In the field of a contact lens solution, some proposals have been made to utilize a viscosity increasing effect and anionic nature of the hyaluronic acid (see Patent Documents 1 to 5, for example). However, most of the proposals are intended to use the high-molecular weight hyaluronic acid, and in their embodiments, contact lens solutions are prepared by using the high-molecular weight hyaluronic acid having a molecular weight of not lower than one million. Some of the proposals indicate that it is possible to use the hyaluronic acid having a wide range of molecular weight, such as a high-molecular weight of not lower than one million, a molecular weight of not higher than 100,000, and a low-molecular weight of not higher than 10,000. However, there is disclosed nothing about the effects of the hyaluronic acids having such different molecular weights with respect to the contact lens. Particularly, the high-molecular weight hyaluronic acid has an excessively high degree of viscosity increasing effect, such that when a small amount of the high-molecular weight hyaluronic acid is added to the contact lens solution, the viscosity of the solution is rapidly increased. As a result, there are inherent risks that the desired hydrophilicity given by the hyaluronic acid cannot be imparted to the contact lens, and the hyaluronic acid has adverse influences on the user's feeling (sense of use) while wearing and scrubbing the contact lens, and on an effect of cleaning the contact lens. Further, none of the documents refer to a relationship between the effect of imparting the hydrophilicity to the contact lens and a number of molecules (molar concentration) of the hyaluronic acid.

On the other hand, the contact lens is preserved in a liquid medium such as an isotonic sodium chloride solution after the contact lens is produced until it is supplied to the consumer (user). Namely, the contact lens is accommodated in a suitable sealable container, together with the liquid medium such as the isotonic sodium chloride solution used as a packaging solution (wrapping solution or preserving solution for distribution), and the container is sealed with the contact lens being immersed in the liquid medium. The sealed container is shipped from a manufacturer as a contact lens packaging product to be supplied to the user (see Patent Documents 6 and 7). The contact lens accommodated in the suitable sealable container is immersed in the packaging solution and sterilized by heating before the contact lens is shipped and supplied to the user. Where the high-molecular weight hyaluronic acid is added to the packaging solution in order to impart a desired viscosity to the solution, the viscosity of the solution decreases due to the above-described heat sterilization treatment, giving rise to a problem that the sense of use and initial wearing comfort of the contact lens are deteriorated when the contact lens is supplied to and used by the user.

PRIOR ART DOCUMENTS

Patent Documents

Patent Document 1: JP-A-2007-264622
Patent Document 2: JP-A-2004-77953
Patent Document 3: JP-A-2011-37737
Patent Document 4: WO2008/001872
Patent Document 5: JP-T-2008-519846
Patent Document 6: JP-T-2004-523777
Patent Document 7: JP-A-2007-44536

SUMMARY OF THE INVENTION

The present inventors conducted various studies in an effort to advantageously improve the water retaining property of the contact lens by using the hyaluronic acid, and revealed that by using a low-molecular weight hyaluronic acid, rather than the high-molecular weight hyaluronic acid, the water retaining effect can be more effectively exhibited without causing adverse influences on the contact lens, and at the same time adhesion of lipid stain to the contact lens can be advantageously prevented owing to the improved hydrophilicity of the contact lens. It was further revealed that where the low-molecular weight hyaluronic acid is used in an amount required for exhibiting the desired water retaining effect, an increase of the viscosity of the contact lens solution is effectively suppressed, and filterability of the solution during a filtration sterilization operation is not excessively deteriorated. Also, the viscosity of the solution is not excessively reduced with time due to the heat sterilization operation. Further, the low-molecular weight hyaluronic acid exhibits no toxicity. Therefore, the solution containing the low-molecular weight hyaluronic acid can be advantageously used as the packaging solution for preserving the contact lens immersed therein for a long period of time, or as a multi-purpose solution which can be used for cleaning, disinfection, sterilization, rinsing, preservation or the like of the contact lens.

The present invention was made in view of the background art described above. Therefore, it is an object of the present invention to provide a system which can exhibit the desired effect of improving the hydrophilicity of the contact lens without causing adverse influences on the sense of use of the contact lens and the cleaning effect, and which can effectively prevent the adhesion of the lipid stain to the contact lens. It is another object of the present invention to provide a contact lens packaging solution which can effectively suppress or prevent reduction of its viscosity with time when it is sterilized by heating.

In order to achieve the above-described objects and other objects which can be understood from the entire description and drawing, the present invention can be suitably carried out in various forms described below, and these forms can be employed in any combination. It is to be understood that the forms and technical features of the present invention are not limited to those described below and should be understood in view of the concept of the invention disclosed in the entire description and drawing.

(1) A system for improving hydrophilicity of a contact lens characterized by using an aqueous solution which contains a low-molecular weight hyaluronic acid having a molecular weight of not higher than 80,000, or a salt or derivative thereof, and which has a pH of 6.0-8.0 and an osmotic pressure of 220-380 mOsm, wherein the above-described contact lens is immersed in the above-described aqueous solution.

(2) The system for improving hydrophilicity of the contact lens according to the above-described form (1), wherein the above-described aqueous solution is sterilized by heating.

(3) The system for improving hydrophilicity of the contact lens according to the above-described form (1), wherein the above-described aqueous solution is sterilized by heating with the above-described contact lens being immersed therein.

(4) The system for improving hydrophilicity of the contact lens according to the above-described form (1), wherein the above-described aqueous solution is sterilized by filtration.

(5) The system for improving hydrophilicity of the contact lens according to any one of the above-described forms (1) to (4), wherein the number of molecules of the above-described low-molecular weight hyaluronic acid or salt or derivative thereof is within a range represented by a formula: $0.8 \leq (C/M) \times 10^7 \leq 10{,}000$, in which "M" is the molecular weight of the above-described low-molecular weight hyaluronic acid or salt or derivative thereof, and "C" is a percentage by weight concentration of the above-described low-molecular weight hyaluronic acid or salt or derivative thereof in the above-described aqueous solution, and a kinetic viscosity of the above-described aqueous solution is lower than 12 $mm^2/s$.

(6) The system for improving hydrophilicity of the contact lens according to the above-described form (5), wherein the above-described number of molecules is within a range represented by a formula: $1.0 \leq (C/M) \times 10^7 \leq 7{,}000$, and the kinetic viscosity of the above-described aqueous solution is lower than 10 $mm^2/s$.

(7) The system for improving hydrophilicity of the contact lens according to any one of the above-described forms (1) to (6), wherein the molecular weight of the above-described low-molecular weight hyaluronic acid or salt or derivative thereof is not higher than 10,000.

(8) The system for improving hydrophilicity of the contact lens according to any one of the above-described forms (1) to (7), wherein the above-described aqueous solution further contains a nonionic tonicity agent having a molecular weight of not higher than 1,000.

(9) The system for improving hydrophilicity of the contact lens according to any one of the above-described forms (1) to (8), wherein the above-described aqueous solution is used as a packaging solution for packaging the above-described contact lens in a container, and the above-described contact lens is immersed in the above-described packaging solution.

(10) A packaging solution for a contact lens characterized by comprising an aqueous solution which contains a low-molecular weight hyaluronic acid having a molecular weight of not higher than 80,000, or a salt or derivative thereof, and which has a pH of 6.0-8.0 and an osmotic pressure of 220-380 mOsm, wherein the above-described packaging solution is accommodated in a sealable container, and at least one contact lens is immersed in the above-described packaging solution, such that hydrophilicity of the above-described at least one contact lens is improved while the above-described at least one contact lens is immersed in the above-described packaging solution.

(11) The packaging solution for the contact lens according to the above-described form (10), wherein the molecular weight of the above-described low-molecular weight hyaluronic acid or salt or derivative thereof is not higher than 10,000.

(12) The packaging solution for the contact lens according to the above-described form (10) or (11), wherein the above-described aqueous solution further contains a nonionic tonicity agent having a molecular weight of not higher than 1,000.

In the system for improving hydrophilicity of a contact lens according to the present invention, the contact lens is immersed in an aqueous solution which contains a low-molecular weight hyaluronic acid having a molecular weight of not higher than 80,000, or a salt or derivative thereof (herein after referred to as the low-molecular weight hyaluronic acids), and which has a predetermined pH and osmotic pressure. Accordingly, the water retaining effect can be effectively imparted to the contact lens without deteriorating user's feeling while wearing and scrubbing the contact lens and the effect of cleaning the contact lens. At the same time, the hydrophilicity of the contact lens can be improved, and adhesion of lipid stain to the contact lens can be advantageously prevented. Further, where the low-molecular weight hyaluronic acids are contained in the aqueous solution in an amount required for exhibiting the desired effect of improving the hydrophilicity of the contact lens, the viscosity of the solution is not excessively increased, so that it is possible to advantageously conduct the filtration sterilization operation. Therefore, the aqueous solution can be used as the multi-purpose solution which can be used for cleaning, disinfection, sterilization, rinsing, preservation or the like of the contact lens, thereby advantageously contributing to the improvement of the hydrophilicity of the contact lens.

Where the above-described aqueous solution containing the low-molecular weight hyaluronic acids according to the present invention is used as the packaging solution which is accommodated in a sealable container and in which the contact lens is immersed, and subjected to the heat sterilization treatment, the viscosity of the solution does not excessively change with time due to the heat sterilization treatment. Accordingly, the solution can effectively maintain a high degree of stability of its quality, making it possible to advantageously avoid or prevent occurrence of problems such as deterioration of the sense of use and the initial wearing comfort of the contact lens supplied to and used by the user.

BRIEF DESCRIPTION OF THE DRAWING

FIG. 1 is a longitudinal cross sectional view showing one embodiment of a contact lens packaging product including a contact lens packaging solution according to the present invention.

DETAILED DESCRIPTION OF THE INVENTION

In a system for improving hydrophilicity of the contact lens according to the present invention, an aqueous solution, in which the contact lens is to be immersed, contains a low-molecular weight hyaluronic acid having a molecular weight of not higher than 80,000, or a salt or derivative thereof (hereinafter referred to as the low-molecular weight hyaluronic acids), and the aqueous solution is adjusted to have a pH of 6.0-8.0 and an osmotic pressure of 220-380 mOsm, whereby the objects of the present invention are advantageously achieved, and filtration sterilization and heat sterilization which are generally applied to a contact lens solution can be advantageously conducted.

Where the above-described low-molecular weight hyaluronic acids have a molecular weight of higher than 80,000, a viscosity increasing effect owing to the presence of the hyaluronic acids is excessively high, so that it is difficult to exhibit a desired effect of improving the hydrophilicity of the contact lens without deteriorating sense of use of the contact lens and an effect of cleaning the contact lens. Also, where such hyaluronic acids having the molecular weight of higher than 80,000 are added to the aqueous solution in an amount required for exhibiting a desired water retaining effect, the viscosity of the solution is excessively increased, giving rise to a problem that filterability of the solution during the filtration sterilization is excessively deteriorated, and the cost of the filtration is increased. Further, where the heat sterilization is conducted on the aqueous solution containing the hyaluronic acids having the molecular weight of higher than 80,000, the viscosity of the solution is excessively reduced with time, giving rise to a risk of deterioration of the sense of use and an initial wearing comfort of the contact lens, for example.

As is well known, the low-molecular weight hyaluronic acids used in the present invention are polymers composed of a basic structure (repeating unit) consisting of glucuronic acid and N-acetylglucosamine which are linked with each other. In the present invention, there are used the low-molecular weight hyaluronic acids having a molecular weight, i.e. a viscosity average molecular weight of not higher than 80,000, preferably not higher than 50,000, and more preferably not higher than 10,000.

The low-molecular weight hyaluronic acids include the salt or derivative of the hyaluronic acid, as well as the hyaluronic acid itself, as described above. The salt or derivative of the hyaluronic acid is not particularly limited as long as it is a physiologically acceptable salt or derivative of the above-described low-molecular weight hyaluronic acid. Specific examples of the salt of the hyaluronic acid include alkali metal salts such as a sodium salt and a potassium salt, salts of alkaline-earth metals such as calcium and magnesium, and salts of metals such as aluminum. Examples of the derivative of the hyaluronic acid include propylene glycol hyaluronate and sodium acetylhyaluronate.

In the present invention, the low-molecular weight hyaluronic acids are contained in the aqueous solution, in which the contact lens is to be immersed, in an amount of generally about 0.01-5% by weight, and preferably about 0.1-3% by weight. In the present invention, the amount of the low-molecular weight hyaluronic acids contained in the aqueous solution is adjusted so as to satisfy the following formula: $0.8 \leq (C/M) \times 10^7 \leq 10,000$, in which "M" is the molecular weight of the low-molecular weight hyaluronic acids and "C" is a percentage by weight concentration of the low-molecular weight hyaluronic acids in the aqueous solution. Further, a kinetic viscosity of the aqueous solution containing the low-molecular weight hyaluronic acids is adjusted to lower than 12 mm$^2$/s. By preparing the aqueous solution so as to contain not less than the predetermined number of molecules (molar concentration) of the low-molecular weight hyaluronic acids, and so as to have the predetermined kinetic viscosity, the water retaining effect can be effectively imparted to the contact lens, and at the same time, the hydrophilicity of the contact lens can be further improved, so that adhesion of lipid stain to the contact lens can be advantageously prevented.

Where the value of $(C/M) \times 10^7$ in the above-indicated inequality exceeds 10,000, or the kinetic viscosity of the aqueous solution is not lower than 12 mm$^2$/s, there arises a risk that adverse influences are given to the sense of use of the contact lens, and the effect of cleaning the contact lens, for example. In the present invention, it is preferable that the number of molecules of the low-molecular weight hyaluronic acids is adjusted to be within a range represented by the following formula: $1.0 \leq (C/M) \times 10^7 \leq 7{,}000$, and the kinetic viscosity of the aqueous solution is adjusted to lower than 10 mm$^2$/s.

In the present invention, the pH of the aqueous solution containing the above-described specific low-molecular weight hyaluronic acids is adjusted within a range of 6.0-8.0. A conventional acid or alkaline agent may be used for adjusting the pH of the aqueous solution. By adjusting the pH of the aqueous solution as described above, stability of the aqueous solution can be improved, and no adverse influence is given to the eye when the contact lens, the hydrophilicity of which is improved according to the present invention, is worn on the eye. Where the pH of the aqueous solution is lower than 6.0 or higher than 8.0, there arises a risk of causing ocular irritation or damage.

Further, the osmotic pressure of the aqueous solution containing the low-molecular weight hyaluronic acids according to the present invention is adjusted to 220-380 mOsm. The osmotic pressure of the aqueous solution can be easily adjusted by adjusting the content of the essential component and further adjusting amounts of addition of components to be added as required, or adding a known tonicity agent as required. By such adjustment of the osmotic pressure of the aqueous solution in which the contact lens is to be immersed, the osmotic pressure becomes substantially equal to the osmotic pressure of the tear fluid, so that the contact lens can be worn on the eye after the contact lens is immersed in the aqueous solution and improved in its hydrophilicity. Further, even when the aqueous solution remaining on and adhering to the surface of the contact lens enters into the eye, irritation of the eye can be advantageously reduced, and adverse influences on the eye can be advantageously prevented.

In the aqueous solution used in the system for improving the hydrophilicity of the contact lens according to the present invention, there may be used various known additional components used for preparation of the conventional contact lens solution, in addition to the low-molecular weight hyaluronic acids which have the particular molecular weight and which are used as the essential component. Examples of the additional components include a chelating agent, a surfactant, a tonicity agent, a buffer, a sterilizing agent and a preservative. Any one or any combination of these additional components may be used. It is required that all components are safe to the living body and ophthalmically and physiologically acceptable, and do not impede the above-described advantages of the present invention. Further, each component is used within a quantitative range which does not impair the advantages of the present invention.

For example, the chelating agent is added to the aqueous solution for the purpose of preventing deposition of ions of metals such as calcium on the contact lens. Specific examples of the chelating agent include: ethylenediamine tetraacetic acid (EDTA), salts of EDTA such as disodium ethylenediamine tetraacetate (EDTA.2Na) and trisodium ethylenediamine tetraacetate (EDTA.3Na), citric acid, gluconic acid, tartaric acid, and salts of these acids (sodium salts, for example). The content of the chelating agent is not particularly limited, but is generally about 0.01-5 w/v %.

The aqueous solution further contains the surfactant for the purpose of cleaning the contact lens, in addition to the purpose of improving the hydrophilicity of the contact lens. It is possible to advantageously employ any of known anionic surfactants, nonionic surfactants, amphoteric surfactants and cationic surfactants, which are conventionally used for the contact lens solution or the like. By addition of the surfactant, the aqueous solution according to the present invention is provided with an advantageous cleaning effect such as a lipid-removing effect, in addition to the effect of preventing the adhesion of the lipid stain, which effect is given by the low-molecular weight hyaluronic acids. Among the above-described surfactants, the nonionic surfactants are preferably used in the present invention. Specific examples of the nonionic surfactants include polyethylene glycol ethers of higher alcohols, polyethylene glycol esters of higher fatty acids, polyglycerol esters of higher fatty acids, polyethylene glycol ethers of alkyl phenols, polyethylene glycol sorbitan alkyl esters, polyoxyethylene castor oil, polyoxyethylene hydrogenated castor oil, polyoxyethylene-polyoxypropylene glycols (poloxamers), and ethylenediamine tetrapolyoxyethylene polyoxypropylenes (poloxamines). These surfactants are used generally in a concentration of about 0.001-10 w/v %, and preferably about 0.005-2 w/v %.

The tonicity agent is added to the aqueous solution in order to easily adjust the osmotic pressure of the aqueous solution, in which the contact lens is to be immersed. Various known tonicity agents generally used for the contact lens solution are appropriately used. Examples of the tonicity agent include salts such as sodium chloride and potassium chloride, saccharides, sugar alcohols, polyols, and ethers and esters thereof. In the present invention, there are advantageously used known nonionic tonicity agents including: polyols such as propylene glycol, dipropylene glycol and glycerol; sugar alcohols such as sorbitol; and saccharides such as trehalose and glucosyl trehalose. Particularly, the nonionic tonicity agents which have a molecular weight of not higher than 1,000 and which can exhibit the desired isotonizing action are advantageously used. By addition of such nonionic tonicity agents, occurrence of the ocular irritation can be advantageously restricted, and the wearing comfort and sense of use of the contact lens can be further improved. The tonicity agent is generally used in a concentration of about 0.01-5 w/v %.

The buffer is added to the aqueous solution according to the present invention in order to advantageously hold the pH of the aqueous solution within the above-described range. The kind of the buffer is not particularly limited, and various known buffers are appropriately used. Specific examples of the buffer include acids such as citric acid, malic acid, lactic acid, ascorbic acid, maleic acid, gluconic acid, phosphoric acid, boric acid, oxycarboxylic acid, amino acids including glycin and glutamic acid, and tris(hydroxymethyl)aminomethane (Tris), and salts thereof (sodium salts, for example); Good-Buffers including taurine and derivatives thereof; and hydroxyalkylamines such as bis(2-hydroxyethyl)iminotris(hydroxymethyl)methane (Bis-Tris). These buffers are advantageously used since they are safe to the eye and have little influence on the contact lens. Particularly, there are advantageously used the citric acid and salts thereof, the phosphoric acid and boric acid and salts thereof, the Good-Buffers, and the hydroxyalkylamines. The content of the buffer is not particularly limited, but is generally about 0.01-2 w/w %.

In the preparation of the aqueous solution according to the present invention, no special method is required. As in the preparation of the conventional contact lens solution, the appropriate components are added to an aqueous medium sequentially or concurrently, or in appropriate combination, without regard to the order of addition of the components, and dispersed or dissolved in the aqueous medium, whereby the desired aqueous solution for improving the hydrophilicity of the contact lens can be easily obtained. It is to be understood that in addition to water such as purified water and distilled water, any known solution may be used as the aqueous medium used in the present invention, as long as a major component of the solution is water. Examples of the solution include an isotonic sodium chloride solution and a preserving or cleaning solution for the contact lens.

In the present invention, the contact lens is immersed in the aqueous solution prepared as described above so as to conduct a treatment of the contact lens for improving its hydrophilicity owing to the low-molecular weight hyaluronic acids. By conducting such a treatment for a sufficient period of time, the desired hydrophilicity is imparted to the contact lens without affecting the sense of use of the contact lens and the cleaning effect, and the adhesion of the lipid stain to the contact lens can be advantageously prevented. Further, it is possible to effectively suppress or prevent an increase of the viscosity of the aqueous solution which contains the low-molecular weight hyaluronic acids and in which the contact lens is to be immersed. Therefore, when the aqueous solution is sterilized by filtration, the aqueous solution does not suffer from an excessive deterioration of filterability. Accordingly, a problem of an undesirable increase of the cost of the filtration is avoided. Further, when the heat sterilization is conducted, excessive reduction of the viscosity of the aqueous solution with time is advantageously suppressed or prevented.

Therefore, the aqueous solution containing the low-molecular weight hyaluronic acids according to the present invention can be used, as the aqueous solution sterilized by heating or filtration, for cleaning, disinfection, sterilization, rinsing, preservation or the like of the contact lens. Further, the heat sterilization operation can be advantageously applied to the aqueous solution which contains the low-molecular weight hyaluronic acids, and in which the contact lens is immersed. Accordingly, the aqueous solution containing the low-molecular weight hyaluronic acids can be advantageously used as a packaging solution (wrapping solution or preserving solution for distribution) for packaging the contact lens in a suitable container, so that the contact lens is immersed in the solution and the hydrophilicity is continuously imparted to the contact lens until it is supplied to the user.

Where the aqueous solution containing the low-molecular weight hyaluronic acids according to the present invention is used as the packaging solution, the aqueous solution is accommodated in the suitable container together with the contact lens, and the container is sealed, whereby a packaging product (wrapping product) to be supplied to the user is obtained, as shown in FIG. 1, for example.

The packaging product 2 shown in FIG. 1 comprises a sealable packaging container 8 including a container main body 4 and a cover sheet 6, one contact lens 10 housed in the packaging container 8, and an aqueous solution 12 according to the present invention which contains the low-molecular weight hyaluronic acids, which is accommodated in the packaging container 8 together with the contact lens 10, and in which the contact lens 10 is immersed. The container main body 4 has a housing cavity 4a which opens upward, and a flange portion 4b formed of an outwardly extending peripheral portion of the housing cavity 4a. While the material of the container main body 4 is not particularly limited, the container main body 4 is generally made of a plastic material such as polypropylene which is chemically stable with respect to the aqueous solution 12 and which has an elution resistance.

On the other hand, the cover sheet 6 has a laminated structure comprising a base sheet 6a and resin film layers 6b and 6c respectively bonded to the upper and lower sides of the base sheet 6a with a known adhesive. Although the material of the base sheet 6a is not particularly limited, a metal foil, a plastic film, synthetic paper or the like is generally advantageously used for the base sheet 6a. Among them, an aluminum foil is particularly preferably used. Further, although the material of the resin film layers 6b and 6c is not particularly limited, a synthetic resin such as polypropylene or polyethylene is generally preferably used for the resin film layers 6b and 6c, since the synthetic resin has a sealing property and makes it possible to advantageously maintain an interior of the container in an aseptic condition. The cover sheet 6 is superposed on the upper surface of the flange portion 4b of the container main body 4 so as to fluid-tightly cover the opening of the housing cavity 4a formed in the container main body 4. The cover sheet 6 is bonded to the upper surface of the flange portion 4b by heat sealing or by using a known adhesive, so as to seal the packaging container 8.

The thus obtained packaging product 2 which includes the aqueous solution according to the present invention as the packaging solution, together with the contact lens 10, is sterilized by heating, and then shipped and supplied to the user (consumer). The contact lens 10 is immersed in the aqueous solution 12 according to the present invention for a long period time until the packaging product 2 supplied to the user is opened, whereby the desired hydrophilicity is imparted to the contact lens 10.

The system for improving the hydrophilicity of the contact lens according to the present invention is applicable to all kinds of contact lens irrespective of their material, which may be a water-containing or non-water-containing material, or which may be a soft or hard material. However, the present invention is mainly applied to the soft contact lens, so that the present invention is advantageously practiced. In this respect, contact lenses composed of water-containing hydrogels are known as the soft contact lenses. Typical examples of such soft contact lenses include contact lenses formed of polymers or copolymers of hydrophilic monomers such as 2-hydroxyethyl methacrylate, N,N-dimethylacrylamide, N-vinyl-2-pyrrolidone and methacrylic acid. In recent years, the soft contact lenses include contact lenses composed of silicone hydrogels, which are copolymers produced by copolymerizing silicone-containing hydrophobic monomers with the above-described hydrophilic monomers. The present invention is also applicable to such soft contact lenses.

EXAMPLES

To further clarify the present invention, there will be described some examples of experiments including Examples according to the present invention. It is to be understood that the present invention is not limited to the details of the following description of the examples of experiments and that the invention may be embodied with various changes, modifications and improvements not described above and below, which may occur to those skilled in the art without departing from the spirit and scope of the invention.

—Influence of Molecular Weight of Hyaluronic Acids on Moisture Retaining Property—

As shown in Table 1 given below, there were used: various sodium hyaluronates (available from Kikkoman Biochemifa Company) having respective different molecular weights; disodium hydrogen phosphate 12-hydrate and sodium dihydrogen phosphate 2-hydrate, which were used as the buffers; and sodium chloride used as the tonicity agent. These components were dissolved in distilled water at respective ratios shown in Table 1, whereby 8 kinds of test liquid (aqueous solution) were prepared. All kinds of test liquid were adjusted to have a pH of 7.4 and an osmotic pressure of 290±30 mOsm.

A cytotoxicity test and a wettability test were conducted on each of the thus prepared 8 kinds of test liquid (aqueous solution) as described below, and results thereof are shown in Table 1.

<Cytotoxicity Test>

"Month Wear" available from Menicon Co., Ltd. was used as a test lens, and immersed in each of the 8 kinds of test liquid shown in Table 1. An immersing cycle of holding the test lens immersed in the test liquid at the room temperature for not shorter than 4 hours was repeated 30 times, whereby the test lens subjected to the immersing treatment was obtained.

On the other hand, about 100 cells of the V79 cell (Chinese hamster lung-derived fibroblast) were disseminated in a cell culture liquid (5 vol % bovine fetal serum-added MEM medium) and cultivated for 24 hours, whereby the culture liquid was prepared.

The test lens subjected to the immersing treatment as described above was submerged in the thus prepared culture liquid and cultivation was conducted for 1 week. Then, the number of cell colonies formed in the culture liquid was counted, and colony formation percentage was calculated according to the equation given below. For the purpose of comparison, there was obtained the number of cell colonies formed in the culture liquid in which the test lens subjected to the immersing treatment was not submerged and which was cultivated for 1 week. The obtained number of cell colonies was used as the denominator in the equation given below.

Colony formation percentage (%)=(number of colonies formed in the culture liquid in which the test lens was immersed)/(number of colonies formed in the culture liquid in which the test lens was not immersed)×100

Cytotoxicity was evaluated as "low" where the colony formation percentage calculated according to the above-indicated equation was not lower than 80%, "average" where the percentage was not lower than 20% and lower than 80%, and "high" where the percentage was lower than 20%.

<Wettability Test>

The test lens ("Month Wear" available from Menicon Co., Ltd.) was immersed in each test liquid for 18 hours at the room temperature, and then the liquid was wiped off from the test lens. A drop of water was put on the test lens at the room temperature, and an angle (°) of contact between the drop of water and the test lens was measured. Wettability was evaluated as "excellent" where the angle was smaller than 60°, "good" where the angle was smaller than 70° and not smaller than 60°, "average" where the angle was smaller than 80° and not smaller than 70°, and "poor" where the angle was not smaller than 80°.

TABLE 1

|  |  | Test Liquids | | | | | | | |
|---|---|---|---|---|---|---|---|---|---|
|  |  | 1 | 2 | 3 | 4 | 5 | 6 | 7 | 8 |
| Composition | disodium hydrogen phosphate 12-hydrate | 0.6% | 0.6% | 0.6% | 0.6% | 0.6% | 0.6% | 0.6% | 0.6% |
|  | sodium dihydrogen phosphate 2-hydrate | 0.053% | 0.053% | 0.053% | 0.053% | 0.053% | 0.053% | 0.053% | 0.053% |
|  | sodium chloride | 0.83% | 0.83% | 0.83% | 0.83% | 0.83% | 0.83% | 0.83% | 0.83% |
|  | sodium hyaluronate (molecular weight of about 5,000) | 0.5% | 1.0% | 3.0% | — | — | — | — | — |
|  | sodium hyaluronate (molecular weight of about 80,000) | — | — | — | 0.05% | 0.1% | 0.3% | — | — |
|  | sodium hyaluronate (molecular weight of about 1,200,000) | — | — | — | — | — | — | 0.05% | — |
|  | sodium hyaluronate (molecular weight of about 2,000,000) | — | — | — | — | — | — | — | 0.05% |
| C/M × $10^7$ | | 1000 | 2000 | 6000 | 6.25 | 12.5 | 37.5 | 0.417 | 0.25 |
| Kinetic Viscosity ($mm^2/s$) | | 1.2 | 1.3 | 1.5 | 1.1 | 1.3 | 3.7 | 2.2 | 2.8 |
| Cytotoxicity after Storing the Lens for 30 Days | | 106% | 103% | 94% | 100% | 95% | 102% | 103% | 99% |

TABLE 1-continued

|  | Test Liquids | | | | | | | |
|---|---|---|---|---|---|---|---|---|
|  | 1 | 2 | 3 | 4 | 5 | 6 | 7 | 8 |
| Evaluation of Cytotoxicity | Low | Low | Low | Low | Low | Low | Low | Low |
| Wettability (Contact Angle) | 58.2 | 61.0 | 53.2 | 68.9 | 64.1 | 66.6 | 87.1 | 88.3 |
| Evaluation of Wettability | Excellent | Good | Excellent | Good | Good | Good | Poor | Poor |

As is apparent from the results shown in Table 1, although all test liquids exhibited low degrees of cytotoxicity, the wettability was evaluated as "poor" in the test liquid Nos. 7 and 8 in which sodium hyaluronates having high molecular weights were used. It is recognized that the test liquid Nos. 7 and 8 cannot provide the desired moisture retaining property.

—Influence of Solution Viscosity on Sense of Use and Cleaning Effect—

Aqueous solutions were prepared by using respective different amounts of sodium hyaluronates having respective different molecular weights, so as to have respective compositions shown in Table 2 given below, whereby 13 kinds of test liquid having respective different kinetic viscosities were obtained. All test liquids were adjusted so as to have a pH of 7.4 and an osmotic pressure of 290±30 mOsm. The polyoxyethylene hydrogenated castor oil 60 was added to all test liquids as a nonionic surfactant.

A scrubbing test and a cleaning effect test were conducted on the thus prepared 13 kinds of test liquid as described below, and the sense of use while scrubbing the lens and the cleaning effect were evaluated. Evaluation results are shown in Table 2.

<Scrubbing Test>

The scrubbing test was conducted by 10 subjects as a blind experiment in which the used test liquids were concealed from the subjects. In the scrubbing test, each subject rinsed a test lens ("Menicon Z" available from Menicon Co., Ltd.) with tap water, and then sufficiently cleaned the test lens by scrubbing the lens with the respective test liquids. The subjects evaluated their feeling while scrubbing the lens with the respective test liquids according to the evaluation standards given below. Average evaluation results are shown in Table 2.

"Good": The lens can be scrubbed with no problem.

"Average": Although the viscosity of the test liquid is high, the lens can be barely scrubbed.

"Bad": The viscosity of the test liquid is too high so that the lens cannot be scrubbed.

<Cleaning Effect Test>

This test was conducted to evaluate a cleaning effect with respect to lipids. 30 mL of each test liquid was accommodated in a test bottle, and 3 colored pseudo eye mucus plates [dye: Sudan I (1%); lipid: triglyceride] were put in the respective bottles. Each test bottle was immersed in a constant-temperature shaker bath set at 25° C., and shaken for 2 or 4 hours. Then, an absorbance of each test liquid at a wavelength of 485 nm was measured, and the cleaning effect with respect to lipids was evaluated based on the absorbance. The absorbance becomes higher in proportion to an amount of the colored pseudo eye mucus transferred to the test liquid. Accordingly, a higher absorbance indicates a higher degree of cleaning effect.

TABLE 2

| | | Test Liquids | | | | | | |
|---|---|---|---|---|---|---|---|---|
| | | 9 | 10 | 11 | 12 | 13 | 14 | 15 |
| Composition | disodium hydrogen phosphate 12-hydrate | 0.6% | 0.6% | 0.6% | 0.6% | 0.6% | 0.6% | 0.6% |
| | sodium dihydrogen phosphate 2-hydrate | 0.053% | 0.053% | 0.053% | 0.053% | 0.053% | 0.053% | 0.053% |
| | sodium chloride | 0.83% | 0.83% | 0.83% | 0.83% | 0.83% | 0.83% | 0.83% |
| | polyoxyethylene hydrogenated castor oil 60 | 0.05% | 0.05% | 0.05% | 0.05% | 0.05% | 0.05% | 0.05% |
| | sodium hyaluronate (molecular weight of about 5,000) | 0.1% | 0.5% | 1.0% | 3.0% | — | — | — |
| | sodium hyaluronate (molecular weight of about 80,000) | — | — | — | — | 0.05% | 0.1% | 0.3% |
| | sodium hyaluronate (molecular weight of about 1,200,000) | — | — | — | — | — | — | — |
| | sodium hyaluronate (molecular weight of about 2,000,000) | — | — | — | — | — | — | — |
| | C/M × $10^7$ | 200 | 1000 | 2000 | 6000 | 6.25 | 12.5 | 37.5 |
| | Kinetic Viscosity (mm$^2$/s) | 1.1 | 1.2 | 1.3 | 1.5 | 1.1 | 1.3 | 3.7 |
| | Sense of Use while Scrubbing the Lens | Good | Good | Good | Good | Good | Good | Good |

TABLE 2-continued

|  |  | | | | | | |
|---|---|---|---|---|---|---|---|
| Cleaning Effect (2 hours) | 0.15 | — | — | 0.15 | 0.17 | — | 0.14 |
| Cleaning Effect (4 hours) | 0.25 | — | — | 0.26 | 0.26 | — | 0.24 |
| Evaluation of Cleaning Effect | Good | — | — | Good | Good | — | Good |

| | | Test Liquids | | | | | |
|---|---|---|---|---|---|---|---|
| | | 16 | 17 | 18 | 19 | 20 | 21 |
| Composition | disodium hydrogen phosphate 12-hydrate | 0.6% | 0.6% | 0.6% | 0.6% | 0.6% | 0.6% |
| | sodium dihydrogen phosphate 2-hydrate | 0.053% | 0.053% | 0.053% | 0.053% | 0.053% | 0.053% |
| | sodium chloride | 0.83% | 0.83% | 0.83% | 0.83% | 0.83% | 0.83% |
| | polyoxyethylene hydrogenated castor oil 60 | 0.05% | 0.05% | 0.05% | 0.05% | 0.05% | 0.05% |
| | sodium hyaluronate (molecular weight of about 5,000) | — | — | — | — | — | — |
| | sodium hyaluronate (molecular weight of about 80,000) | — | — | — | — | — | — |
| | sodium hyaluronate (molecular weight of about 1,200,000) | 0.05% | 0.25% | — | — | — | — |
| | sodium hyaluronate (molecular weight of about 2,000,000) | — | — | 0.05% | 0.15% | 0.2% | 0.3% |
| C/M × $10^7$ | | 0.42 | 2.08 | 0.3 | 0.8 | 1.0 | 1.5 |
| Kinetic Viscosity (mm$^2$/s) | | 2.2 | 22.3 | 2.8 | 15.2 | 33.8 | 75.3 |
| Sense of Use while Scrubbing the Lens | | Good | Poor | Good | Average | Poor | Poor |
| Cleaning Effect (2 hours) | | 0.15 | 0.03 | 0.12 | 0.05 | 0.02 | 0.00 |
| Cleaning Effect (4 hours) | | 0.24 | 0.15 | 0.21 | 0.18 | 0.11 | 0.04 |
| Evaluation of Cleaning Effect | | Good | Poor | Good | Poor | Poor | Poor |

As is apparent from the results shown in Table 2, the kinetic viscosity of the solution increases as the molecular weight of the sodium hyaluronate increases, and as the amount of the addition of the sodium hyaluronate increases. It is recognized that in the test liquids using the high-molecular weight sodium hyaluronates, the kinetic viscosity thereof is excessively increased, and the sense of use while scrubbing the lens is deteriorated. Further, the desired cleaning effect with respect to the lipids is not achieved in such test liquids. In the test liquid Nos. 16 and 18, the sense of use while scrubbing the lens and the cleaning effect are evaluated as "Good" even though the high-molecular weight sodium hyaluronates were used. However, as is apparent from the evaluation results of the wettability shown in the above-indicated Table 1, the desired effect of improving the hydrophilicity cannot be achieved in the test liquids containing the high-molecular weight sodium hyaluronates.

—Evaluation of Effect of Preventing Adhesion of Lipid and Wearing Comfort—

Aqueous solutions having respective compositions shown in Table 3 given below were prepared as test liquids. Contact lenses were treated by using the respective test liquids, and the effect of preventing adhesion of the lipids and the wearing comfort were evaluated for each contact lens. In the test liquids, propylene glycol, glycerol, dipropylene glycol, sorbitol, trehalose, and glucosyl trehalose were used as the nonionic tonicity agents having molecular weights of not higher than 1,000. All test liquids were adjusted to have a pH of 7.4±0.2 and an osmotic pressure of 290±15 mOsm.

<Lipid Adhesion Prevention Test>

A test lens ("Menicon 2 Week Premio" available from Menicon Co., Ltd.) was immersed in each test liquid shown in Table 3, and held at the room temperature for 18 hours, whereby a hydrophilization treatment was conducted by using each test liquid.

Then, Sudan Black (available from Wako Pure Chemical Industries, Ltd.) was dissolved in 10 mL of ethanol at a concentration of 70%, and 90 mL of distilled water was added, whereby a Sudan Black solution was prepared. The test lens subjected to the hydrophilization treatment as described above was placed in 2 mL of the Sudan Black solution, and held for 2 hours. Then, the test lens was transferred into 2 mL of ethanol of 100% concentration to extract Sudan Black. The thus obtained solution in which Sudan Black was extracted was measured of its absorbance at a wavelength of 600 nm, whereby an amount of Sudan Black adsorbed to the test lens treated with each test liquid was obtained. The effect of each test liquid for preventing adhesion of the lipids was evaluated based on a percentage (%) value obtained by comparing the above-described absorbance with an absorbance of a solution prepared by immersing the above-described test lens in an isotonic sodium chloride solution.

<Wearing Comfort Test>

5 subjects rinsed a test lens ("Menicon Z" available from Menicon Co., Ltd.) with tap water, then sufficiently cleaned the test lens by scrubbing the lens with each test liquid, and wore the lens. The subjects evaluated the wearing comfort right after wearing the lens, and at the time when 1 hour had passed after wearing the lens, on a 100-point scale. The wearing comfort was evaluated as "Excellent" where average points of both of the wearing comfort right after the wearing and 1 hour after the wearing were not less than 90 points; "Good" where an average point of the wearing comfort right after the wearing was not less than 90 points, and an average point of the wearing comfort 1 hour after the wearing was less than 90 points; "Average" where average points of both of the wearing comfort right after the wearing and 1 hour after the wearing were less than 90 points and not less than 80 points; and "Poor" where average points of both of the wearing comfort right after the wearing and 1 hour after the wearing were less than 80 points.

TABLE 3

|  |  | Test Liquids | | | | | | |
|---|---|---|---|---|---|---|---|---|
|  |  | 2 | 6 | 8 | 22 | 23 | 24 | 25 |
| Composition | disodium hydrogen phosphate 12-hydrate | 0.6% | 0.6% | 0.6% | 0.6% | 0.6% | 0.6% | 0.6% |
|  | sodium dihydrogen phosphate 2-hydrate | 0.053% | 0.053% | 0.053% | 0.053% | 0.053% | 0.053% | 0.053% |
|  | sodium chloride | 0.83% | 0.83% | 0.83% | 0.83% | 0.53% | 0.53% | 0.53% |
|  | propylene glycol | — | — | — | — | 0.76% | — | — |
|  | glycerol | — | — | — | — | — | 0.92% | — |
|  | dipropylene glycol | — | — | — | — | — | — | 1.34% |
|  | sorbitol | — | — | — | — | — | — | — |
|  | trehalose | — | — | — | — | — | — | — |
|  | glucosyl trehalose | — | — | — | — | — | — | — |
|  | sodium hyaluronate (molecular weight of about 5,000) | 1.0% | — | — | — | 1.0% | 1.0% | 1.0% |
|  | sodium hyaluronate (molecular weight of about 80,000) | — | 0.3% | — | — | — | — | — |
|  | sodium hyaluronate (molecular weight of about 2,000,000) | — | — | 0.05% | — | — | — | — |
| $C/M \times 10^7$ | | 2000 | 37.5 | 0.25 | — | 2000 | 2000 | 2000 |
| Lipid Adhesion Percentage | | 35.2% | 39.1% | 73.2% | 103.2% | 26.9% | 32.3% | 38.1% |
| Evaluation of Lipid Adhesion Prevention | | Good | Good | Average | Poor | Excellent | Good | Good |
| Wearing Comfort | | Good | Good | Average | — | Excellent | Good | Good |

|  |  | Test Liquids | | | | | |
|---|---|---|---|---|---|---|---|
|  |  | 26 | 27 | 28 | 29 | 30 | 31 |
| Composition | disodium hydrogen phosphate 12-hydrate | 0.6% | 0.6% | 0.6% | 0.6% | 0.6% | 0.6% |
|  | sodium dihydrogen phosphate 2-hydrate | 0.053% | 0.053% | 0.053% | 0.053% | 0.053% | 0.053% |
|  | sodium chloride | 0.53% | 0.53% | 0.53% | 0.53% | 0.53% | 0.53% |
|  | propylene glycol | — | — | — | 0.76% | 0.76% | 0.76% |
|  | glycerol | — | — | — | — | — | — |
|  | dipropylene glycol | — | — | — | — | — | — |
|  | sorbitol | 1.82% | — | — | — | — | — |
|  | trehalose | — | 3.42% | — | — | — | — |
|  | glucosyl trehalose | — | — | 5.04% | — | — | — |
|  | sodium hyaluronate (molecular weight of about 5,000) | 1.0% | 1.0% | 1.0% | — | — | — |
|  | sodium hyaluronate (molecular weight of about 80,000) | — | — | — | 0.3% | — | — |
|  | sodium hyaluronate (molecular weight of about 2,000,000) | — | — | — | — | 0.05% | — |
| $C/M \times 10^7$ | | 2000 | 2000 | 2000 | 37.5 | 0.3 | — |
| Lipid Adhesion Percentage | | 27.3% | 35.8% | 22.3% | 40.1% | 68.8% | 65.9% |
| Evaluation of Lipid Adhesion Prevention | | Excellent | Good | Excellent | Good | Average | Average |
| Wearing Comfort | | Excellent | Good | Excellent | Excellent | Good | — |

As is apparent from the results shown in Table 3, the test liquid Nos. 2, 6 and 8 which contain the sodium hyaluronates exhibit a certain effect of preventing adhesion of the lipids as compared with the test liquid No. 22 which does not contain the sodium hyaluronate. It is recognized that the effect of preventing adhesion of the lipids is particularly high in the test liquid Nos. 2 and 6 which contain the low-molecular weight sodium hyaluronates, and the wearing comfort is also improved in the test liquid Nos. 2 and 6. It is also recognized that the effect of preventing adhesion of the lipids and the wearing comfort are significantly improved in the test liquid Nos. 23-28 which contain the nonionic tonicity agents as well as the low-molecular weight sodium hyaluronates, as compared with the test liquid No. 31 which does not contain the sodium hyaluronate, and the test liquid No. 30 which contains the high-molecular weight sodium hyaluronate.

—Influence of Heat Sterilization on Viscosity—

A heat sterilization treatment of 121° C.×20 minutes was conducted by using each of the test liquid Nos. 12, 17, 20 and 21 shown in the above-indicated Table 2, and the kinetic viscosity of each test liquid was measured before and after the heat sterilization treatment. Results of the measurement are shown in Table 4 given below.

TABLE 4

|  |  | Test Liquids | | | |
|---|---|---|---|---|---|
|  |  | 12 | 17 | 20 | 21 |
| Composition | disodium hydrogen phosphate 12-hydrate | 0.6% | 0.6% | 0.6% | 0.6% |
|  | sodium dihydrogen phosphate 2-hydrate | 0.053% | 0.053% | 0.053% | 0.053% |

TABLE 4-continued

|  | Test Liquids | | | |
|---|---|---|---|---|
|  | 12 | 17 | 20 | 21 |
| sodium chloride | 0.83% | 0.83% | 0.83% | 0.83% |
| polyoxyethylene hydrogenated castor oil 60 | 0.05% | 0.05% | 0.05% | 0.05% |
| sodium hyaluronate (molecular weight of about 5,000) | 3.0% | — | — | — |
| sodium hyaluronate (molecular weight of about 1,200,000) | — | 0.25% | — | — |
| sodium hyaluronate (molecular weight of about 2,000,000) | — | — | 0.2% | 0.3% |
| $C/M \times 10^7$ | 6000 | 2.08 | 1.0 | 1.5 |
| Kinetic Viscosity before Heat Sterilization (mm$^2$/s) | 1.5 | 22.3 | 33.8 | 75.3 |
| Kinetic Viscosity after Heat sterilization (mm$^2$/s) | 1.2 | 6.1 | 9.3 | 13.6 |
| Amount of Change of Kinetic Viscosity (mm$^2$/s) | 0.3 | 16.2 | 24.5 | 61.7 |
| Percentage of Change of Kinetic Viscosity (%) | 20 | 73 | 72 | 82 |

As is apparent from the results shown in Table 4, the test liquid No. 12 containing the low-molecular weight sodium hyaluronate according to the present invention has a small amount of change of its viscosity before and after the heat sterilization. On the other hand, it is recognized that in the test liquid Nos. 17, 20 and 21 which contain the high-molecular weight sodium hyaluronates, the viscosity of the solution excessively decreases due to the heat sterilization treatment, giving rise to an inherent problem of a considerable change of the properties of the solution.

—Evaluation of Filterability—

The test liquid Nos. 12, 15, 17, 20 and 21 shown in the above-indicated Table 2 were used. Each test liquid was accommodated in a pressure filtration tank, and the tank was connected with a membrane filter (material: hydrophilic polyether sulfone; disc diameter: 47 mm; filter pore diameter: 0.2 μm) for filtration sterilization available from Sartorius, Germany. A pressure filtration was carried out at a pressure of 1.0 kg/cm$^2$ for 10 minutes, whereby a filtration amount of each test liquid was obtained. On the other hand, a comparative solution which does not contain the sodium hyaluronate was subjected to the above-described pressure filtration, and the filtration amount of the comparative solution per 10 minutes was obtained. The filterability of each test liquid was evaluated as "Good" where the filtration amount of the test liquid was not smaller than 80% with respect to the filtration amount of the comparative solution, "Average" where the filtration amount of the test liquid was not smaller than 50% and smaller than 80% with respect to the filtration amount of the comparative solution, and "Poor" where the filtration amount of the test liquid was smaller than 50% with respect to the filtration amount of the comparative solution. Evaluation results are shown in Table 5 given below.

TABLE 5

|  |  | Test Liquids | | | | |
|---|---|---|---|---|---|---|
|  |  | 12 | 15 | 17 | 20 | 21 |
| Composition | disodium hydrogen phosphate 12-hydrate | 0.6% | 0.6% | 0.6% | 0.6% | 0.6% |
|  | sodium dihydrogen phosphate 2-hydrate | 0.053% | 0.053% | 0.053% | 0.053% | 0.053% |
|  | sodium chloride | 0.83% | 0.83% | 0.83% | 0.83% | 0.83% |
|  | polyoxyethylene hydrogenated castor oil 60 | 0.05% | 0.05% | 0.05% | 0.05% | 0.05% |
|  | sodium hyaluronate (molecular weight of about 5,000) | 3.0% | — | — | — | — |
|  | sodium hyaluronate (molecular weight of about 80,000) | — | 0.3% | — | — | — |
|  | sodium hyaluronate (molecular weight of about 1,200,000) | — | — | 0.25% | — | — |
|  | sodium hyaluronate (molecular weight of about 2,000,000) | — | — | — | 0.2% | 0.3% |
| $C/M \times 10^7$ |  | 6000 | 37.5 | 2.08 | 1.0 | 1.5 |
| Kinetic Viscosity (mm$^2$/s) |  | 1.5 | 3.7 | 22.3 | 33.8 | 75.3 |
| Filterability |  | Good | Good | Poor | Poor | Poor |

As is apparent from the results shown in Table 5, the test liquid Nos. 12 and 15 which contain the low-molecular weight sodium hyaluronates according to the present invention exhibit high degrees of filterability. On the other hand, in the test liquid Nos. 17, 20 and 21 which contain the high-molecular weight sodium hyaluronates, the amounts of filtration are reduced to 50% or less due to the addition of such sodium hyaluronates, and the filterability is excessively deteriorated.

NOMENCLATURE OF REFERENCE SIGNS

2: Packaging Product
4: Container Main Body
4a: Housing Cavity
4b: Flange Portion
6: Cover Sheet
6a: Base Sheet
6b, 6c: Resin Film Layers
8: Packaging Container
10: Contact Lens
12: Aqueous Solution

The invention claimed is:

1. An aqueous-solution-based system comprising:
an aqueous solution that (i) includes a low-molecular weight hyaluronic acid having a viscosity average molecular weight of not higher than 80,000, or a salt thereof, and (ii) has a pH of 6.0-8.0 and an osmotic pressure of 220-380-mOsm; and
a contact lens immersed in the aqueous solution so as to improve hydrophilicity of the contact lens.

2. The system according to claim 1, wherein the aqueous solution is sterile.

3. The system according to claim 1, wherein the aqueous solution is a heat-sterilized aqueous solution.

4. The system according to claim 1, wherein the aqueous solution is a filtration-sterilized aqueous solution.

5. The system according to claim 1, wherein:
the number of molecules of the low-molecular weight hyaluronic acid having a viscosity average molecular weight of not higher than 80,000 or salt thereof is within a range represented by a formula:

$0.8 \leq (C/M) \times 10^7 \leq 10{,}000$, in which "M" is the molecular weight of the low-molecular weight hyaluronic acid having a viscosity average molecular weight of not higher than 80,000 or salt thereof, and "C" is a percentage by weight concentration of the low-molecular weight hyaluronic acid having a viscosity average molecular weight of not higher than 80,000 or salt thereof in the aqueous solution; and
a kinetic viscosity of the aqueous solution is lower than 12 mm$^2$/s.

6. The system according to claim 5, wherein the number of molecules is within a range represented by a formula: $1.0 \leq (C/M) \times 10^7 \leq 7{,}000$, and the kinetic viscosity of the aqueous solution is lower than 10 mm$^2$/s.

7. The system according to claim 1, wherein the molecular weight of the low-molecular weight hyaluronic acid or salt thereof is not higher than 10,000.

8. The system according to claim 1, wherein the aqueous solution further includes a nonionic tonicity agent having a molecular weight of not higher than 1,000.

9. A contact-lens packaging comprising a container, and the system according to claim 1 within the container.

10. The system according to claim 1, wherein the aqueous solution further includes a tonicity agent and a buffer.

11. The system according to claim 1, wherein the contact lens is a soft contact lens that is a silicone hydrogel.

12. A contact-lens packaging product comprising:
a sealed container;
an aqueous solution within the container that includes a low-molecular weight hyaluronic acid having a viscosity average molecular weight of not higher than 80,000, or a salt thereof, and (ii) has a pH of 6.0-8.0 and an osmotic pressure of 220-380 mOsm, and
at least one contact lens immersed in the aqueous solution.

13. The packaging product according to claim 12, wherein the molecular weight of the low-molecular weight hyaluronic acid or salt thereof is not higher than 10,000.

14. The packaging product according to claim 12, wherein the aqueous solution further includes a nonionic tonicity agent having a molecular weight of not higher than 1,000.

15. The packaging product according to claim 12, wherein:
the number of molecules of the low-molecular weight hyaluronic acid or salt thereof is within a range represented by a formula:

$0.8 \leq (C/M) \times 10^7 \leq 10{,}000$, in which "M" is the molecular weight of the low-molecular weight hyaluronic acid having a viscosity average molecular weight of not higher than 80,000 or salt thereof, and "C" is a percentage by weight concentration of the low-molecular weight hyaluronic acid having a viscosity average molecular weight of not higher than 80,000 or salt thereof in the aqueous solution, and
a kinetic viscosity of the aqueous solution is lower than 12 mm$^2$/s.

16. The packaging product according to claim 15, wherein the number of molecules is within a range represented by a formula: $1.0 \leq (C/M) \times 10^7 \leq 7{,}000$, and the kinetic viscosity of the aqueous solution is lower than 10 mm$^2$/s.

17. The packaging product according to claim 12, wherein the aqueous solution further includes a tonicity agent and a buffer.

18. The packaging product according to claim 12, wherein the contact lens is a soft contact lens that is a silicone hydrogel.

19. A method of improving hydrophilicity of a contact lens, comprising immersing the contact lens into an aqueous solution that (i) includes a low-molecular weight hyaluronic acid having a viscosity average molecular weight of not higher than 80,000, or a salt thereof, and (ii) has a pH of 6.0-8.0 and an osmotic pressure of 220-380 mOsm.

20. The method according to claim 19, wherein the aqueous solution further includes a tonicity agent and a buffer.

21. The method according to claim 19, wherein the contact Lens is a soft contact lens that is a silicone hydrogel.

22. The method according to claim 19, wherein the contact angle of the contact lens with water is less than 70° after immersion of the contact lens in said aqueous solution.

23. A method of packaging a contact lens comprising:
providing the contact lens and an aqueous solution within a packaging container, wherein the aqueous solution (i)

includes a low-molecular weight hyaluronic acid having a viscosity average molecular weight of not higher than 80,000, or a salt thereof, and (ii) has a pH of 6.0-8.0 and an osmotic pressure of 220-380 mOsm;

sealing the packaging container with the contact lens and aqueous solution therein; and heat-sterilizing the aqueous solution and contact lens within the sealed packaging container.

* * * * *